INVENTOR
AUGUST F. HEMME.
BY

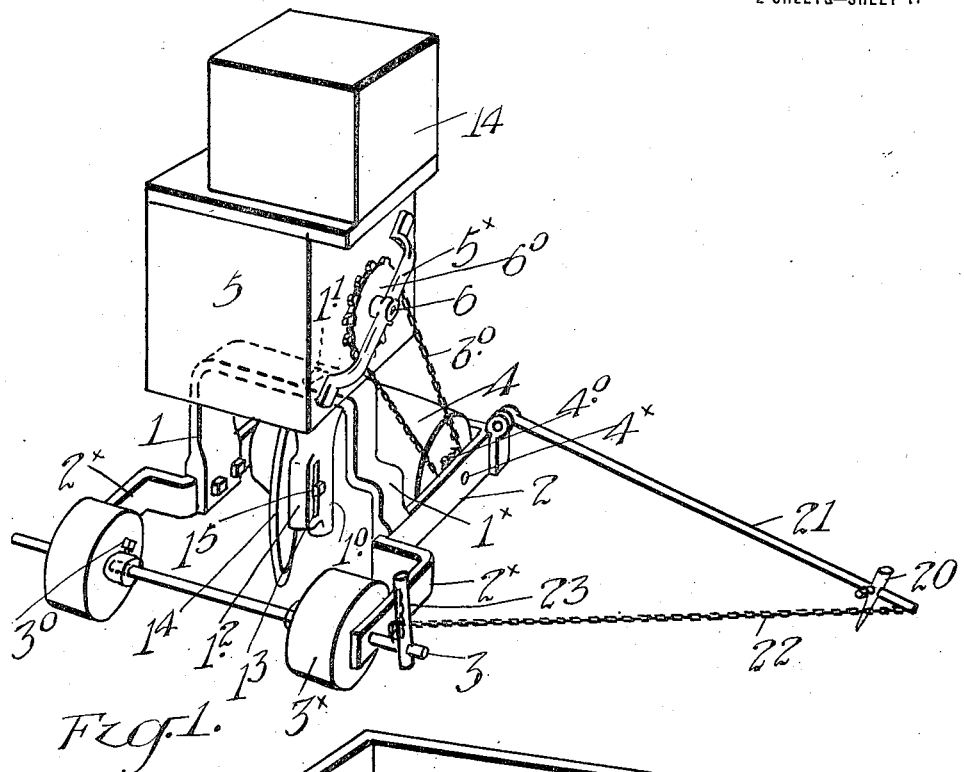
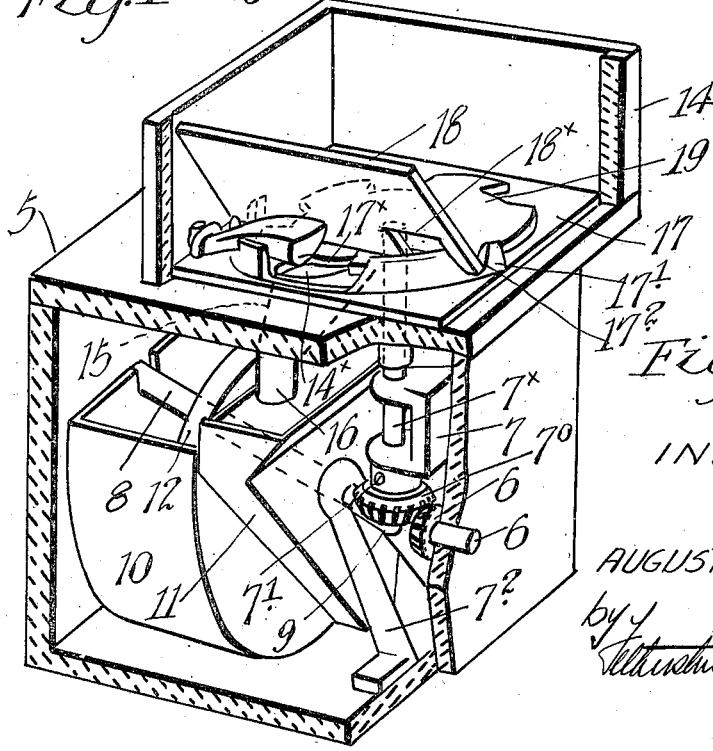

UNITED STATES PATENT OFFICE.

AUGUST FREDRICK HEMME, OF DUBLIN, ONTARIO, CANADA.

SEEDING-MACHINE.

1,380,555.

Specification of Letters Patent. Patented June 7, 1921.

Application filed April 7, 1919. Serial No. 288,026.

*To all whom it may concern:*

Be it known that I, AUGUST FREDRICK HEMME, of the town of Dublin, in the county of Perth, in the Province of Ontario, Canada, have invented certain new and useful Improvements in Seeding-Machines, of which the following is the specification.

My invention relates to improvements in seeding machines and the object of the invention is to devise a machine particularly adaptable for sowing truck seeds, which will sow such seeds at the required distance apart and thereby overcome the necessity for afterward thinning the crop and preventing crowding during growing and at the same time provide means for feeding a certain amount of fertilizer so as to be deposited with each seed and means for adjusting the fertilizer feeding device so that the fertilizer may be fed at any required distance from the deposited seed and also to provide such a machine which will be adaptable either for sowing on the level or in a ridge and in which the seed spout is kept at a definite distance from the ground so that it will not clog or trail the seed and it consists essentially of the following arrangement and construction of parts as hereinafter more particularly explained.

Figure 1, is a perspective view of my seeding device.

Fig. 2, is an enlarged perspective detail of the main portion of the operating mechanism showing the casing broken away.

In the drawings like characters of reference indicate corresponding parts in the various figures.

Figure 3:
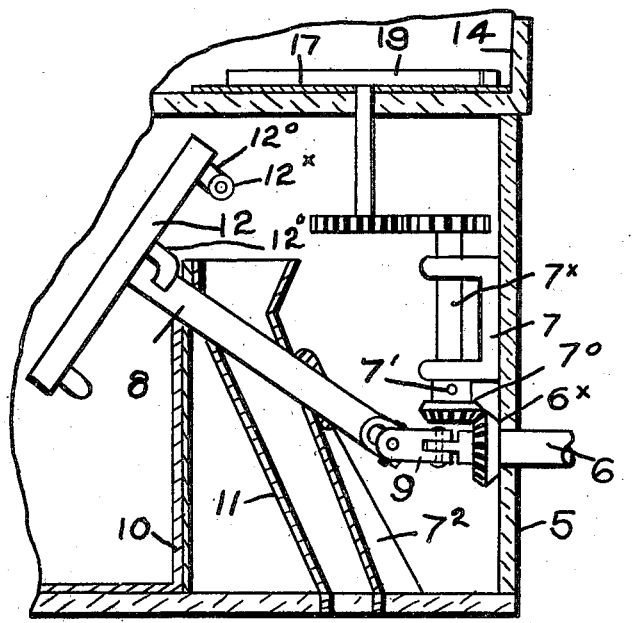
Fig. 3, is a perspective detail of the seed depositing wheel and a portion of the hopper co-acting therewith.

1 indicates the main vertical casting which is substantially inverted U-shape, one arm of which is provided with an offset $1^x$. 2 indicates a horizontal frame, the major portion of which is also U-shape and secured to the lower ends of the arms of the frame 1. The outer ends of the arms of the frame 2 are offset at $2^x$. 3 indicates an axle mounted in the offset portions $2^x$ of the arms 2. $3^x$ indicate rollers adjustably mounted upon the shaft 3 and secured at suitable distances apart by set screws $3°$. 4 indicates a broad roller secured in the opposite end or base of the U-shape frame 2 upon a shaft $4^x$. $4°$ indicates a pinion secured to the shaft $4^x$.

$1°$ indicates a seed spout which depends from the upper portion of the inverted U-shape frame 1, $1'$ being the seed orifice through which the seed passes into the spout. $1^2$ indicates an enlargement extending rearwardly from the depending seed spout $1°$ and provided with a vertical slot $1^3$. $1^4$ indicates a disk which is adjustably secured to the slot $1^3$ by a bolt $1^5$. 5 indicates a casing which is carried by the U-shape frame 1. 6 indicates a short shaft journaled in the wall of the casing 5 and in a bracket $5^x$ which is secured to the casing wall. $6^x$ indicates a bevel pinion secured to the inner end of the shaft 6 and $6°$ indicates a sprocket gear secured to the shaft 6 within the bracket $5^x$ and connected by a sprocket chain $6'$ to the sprocket pinion $4°$. 7 indicates a bracket secured within the casing 5 and in which is journaled a vertical shaft $7^x$ upon the lower end of which is secured a bevel gear $7°$ meshing with the bevel pinion $6^x$. The bevel gear $7°$ is secured to the shaft $7^x$ by a set screw $7'$. $7^2$ indicates a supplemental bearing bracket which extends upwardly from the bottom of the casing 5 in an inclined direction and in which and in the opposite wall of the casing is journaled an inclined shaft 8. 9 indicate links connecting the inner end of the shaft 6 with the adjacent end of the shaft 8 so as to form a universal drive.

10 indicates a seed containing hopper. 11 indicates a seed receiving chute which tapers downwardly, the lower end of the chute being directly over the seed receiving orifice $1'$ of the frame 1. 12 indicates a disk which is mounted upon the shaft 8 and is, therefore, in an inclined position in relation to the hopper 10, the upper portion of the disk overhanging the open upper end of the chute 11. $12^x$ indicate a series of cups provided with stems $12°$ extending from the under face of the disk 12 and having their cup faces extending at right angles to the disk and in such a position that as the disk revolves they pass through the body of seed contained in the hopper 10 and carry up a cupful which is inverted as the cup is carried into a position to overhang the chute 11 thereby discharging the seed into such chute to deposit it.

14 indicates a supplemental casing carried by the casing 5 and which is designed to contain a suitable fertilizer. $14^x$ indicates a discharge orifice formed in the top wall of the casing 5 which also forms the bottom wall of the casing 14. 15 indicates a chute extending downwardly from the orifice 14$^x$, the lower end of which is formed into a spout 16 depending over the open upper end of the chute 11. 17 indicates a plate which fits the bottom of the casing 14 and is provided with an orifice 17$^x$ fitting over the orifice 14$^x$. 18 indicates an inclined plate having a notch 18$^x$ in its lower edge. The plate 17 is provided with an arc-shaped rib 17' extending around the orifice 17$^x$, such rib being provided with notches 17$^2$ in which the lower edge of the plate 18 rests. 19 indicates a peripherally notched wheel which is driven from the shaft 7$^x$, such notched wheel resting upon the plates 17.

As the wheel 19 revolves a certain amount of fertilizer is carried by the notches concentrically, each notch carrying the same amount beneath the lower edge of the inclined plate 18 so as to deposit it in the orifice 17$^x$.

It will be understood that the wheel 19 may be arranged to have the same number of peripheral notches as there are cups secured to the face of the disk 12 and that the disk 19 may be so driven as to deposit an amount of fertilizer simultaneously with the depositing of the seed from each cup into the hopper 11 so that the seed and the fertilizer pass down through the chute 11 and through the seed spout 1° to the ground.

If it is desired to deposit the fertilizer behind the depositing of the seed this may be done by loosening the set screw 7' and turning the disk 19 around so as to change the relative position of the notches when driven in relation to the cups so that the feeding of the fertilizer may be either advanced or retarded as desired.

It will, of course, be understood that my seeder may be adapted to sow seeds of any desired size, the size of the machine being regulated in accordance with the size of the cups regulated to lift the required size of seed or the required number of seeds at each operation.

20 indicates a marker which is carried upon a swinging arm 21 hingedly mounted at the front end of the frame 2, the outer end of the arm 21 being connected by a chain 22 to a post 23 carried by the axle 3.

From this description it will be seen that I have devised a very simple form of machine adaptable for sowing truck seeds, which will sow such seeds at the required distance apart and thereby overcome the necessity for afterward thinning the crop and which will also prevent overcrowding of the crop during growing so that air and moisture will more readily reach the roots and which will also allow of the plants being easily and thoroughly hoed, in which the fertilizer may be deposited at the same time as the seed so as to fall with the seed or at any desired distance therefrom and which is adaptable for sowing seed on the level or in a ridge, the rollers 3$^x$ passing over the level surface of the ground, the marker 20 marking out simultaneously the next row, the disk 1$^4$ forming the furrow into which the seed and fertilizer is deposited as it falls and also by adjusting the disk 1$^4$ it will be readily seen that the seed spout will be held clear of the ground and, therefore, prevent weeds or other matter engaging therewith which would have a tendency to drag the seed and thereby leave bare spaces or unsown portions in the furrow.

What I claim as my invention is—

1. In a device of the class described, the combination with the seed container and discharge spout located adjacent to the container, of a disk rotatably mounted and set in an inclined position so that the lower peripheral portion thereof extends into the body of the seed in the seed container and the upper peripheral portion overhangs the seed discharge spout, and cups carried on the under face of the inclined disk and projecting therefrom for lifting successively portions of seed and discharging them into the seed discharge spout.

2. In a device of the class described, the combination with the seed container and seed discharge spout located adjacent to the container, and a disk rotatably mounted in an inclined position so that the lower peripheral portion extends into the body of the seed in the seed container, and the upper peripheral portion overhangs the seed discharge spout, and cups, comprising stems extending from the under face of the inclined disk adjacent to the periphery and portions extending at right angles to the stems and having cupped ends having their faces set radially to the center of the disk.

AUGUST FREDRICK HEMME.

Witnesses:
M. EGAN,
G. FORMAN.